S. OLSON.
BREAD PROOFING APPARATUS.
APPLICATION FILED JAN. 4, 1913.
1,099,266.
Patented June 9, 1914.
2 SHEETS—SHEET 1.
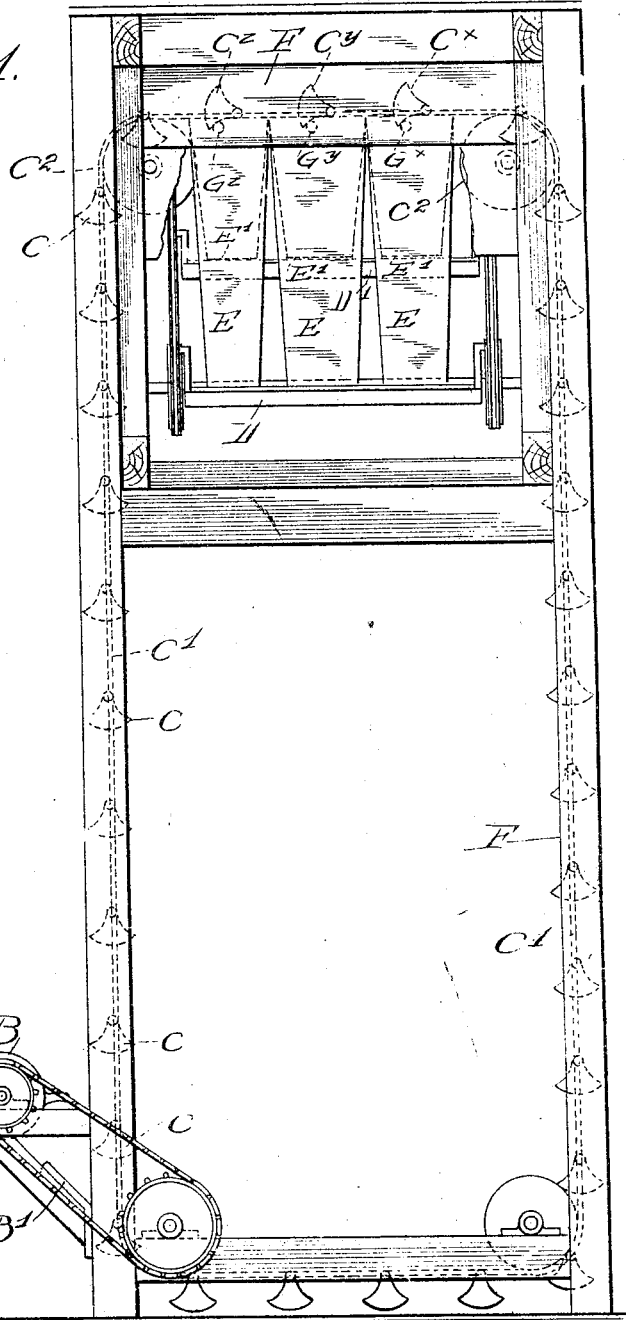
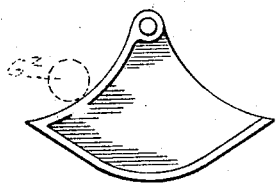
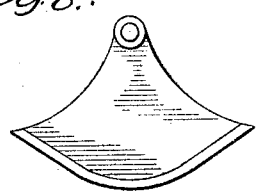
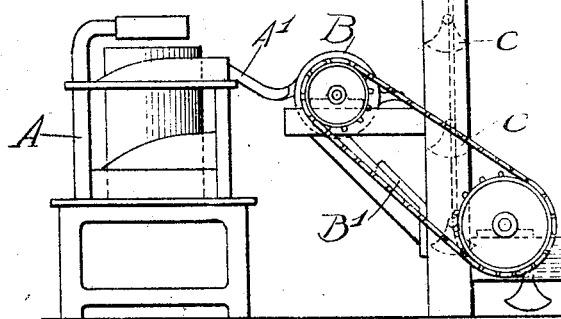
Witnesses:
Inventor
Samuel Olson
by Burton & Burton
att'ys

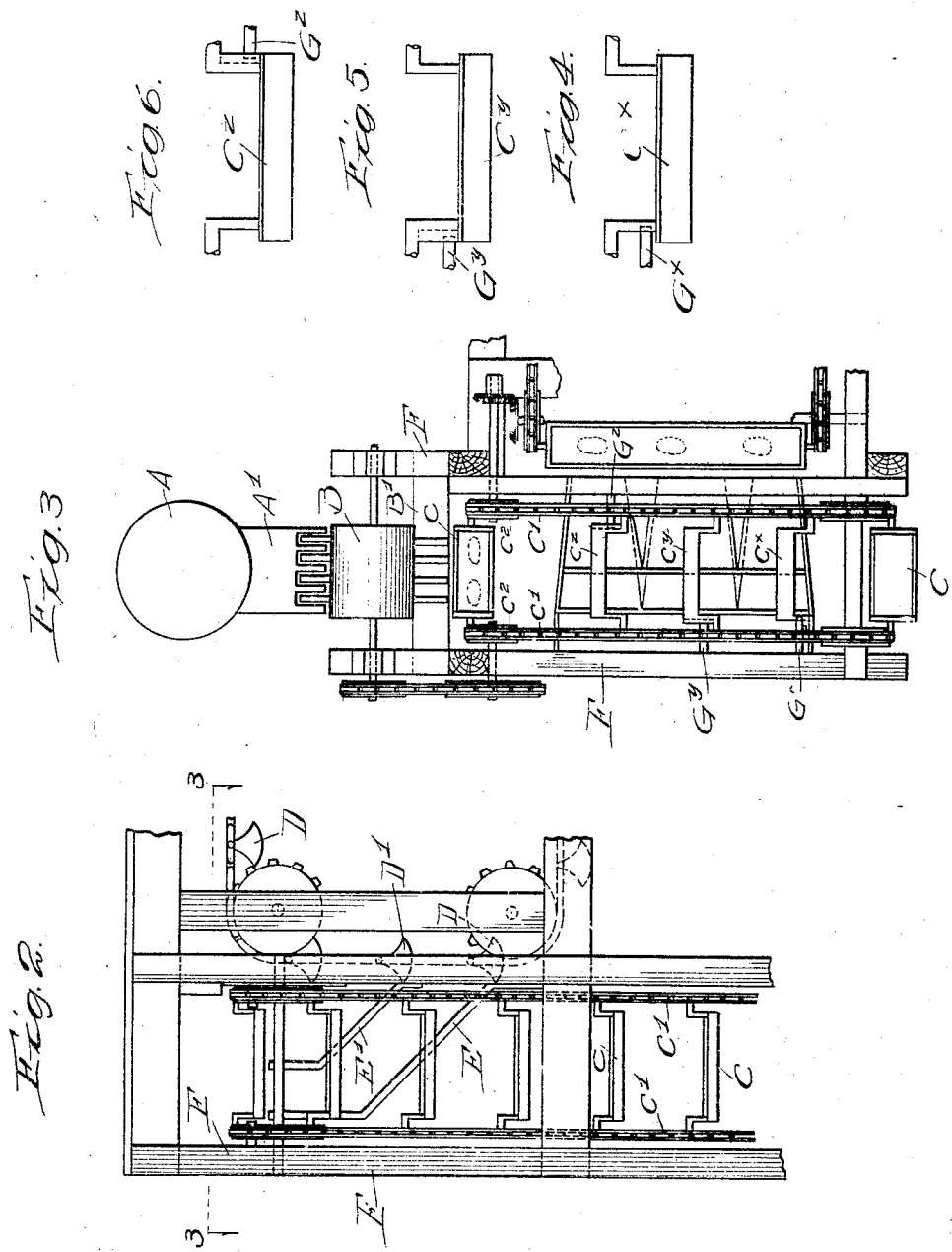

UNITED STATES PATENT OFFICE.

SAMUEL OLSON, OF CHICAGO, ILLINOIS.

BREAD-PROOFING APPARATUS.

1,099,266.  Specification of Letters Patent.  Patented June 9, 1914.

Application filed January 4, 1913. Serial No. 740,120.

*To all whom it may concern:*

Be it known that I, SAMUEL OLSON, a citizen of the United States of America, residing at Chicago, in the county of Cook and State of Illinois, have invented new and useful Improvements in Bread-Proofing Apparatus, of which the following is a specification, reference being had to the accompanying drawings, forming a part thereof.

The purpose of this invention is to provide an improved system of a conveying apparatus for use in the process of proofing bread dough and the like, and relates particularly to a mechanism designed to be interposed between the rounder-up or corresponding machine and the proofing conveyer proper.

The invention consists of the features and elements described and shown in the drawings as indicated in the claims.

In the drawings:—Figure 1 is an elevation of the interposed conveyer and a rounder-up from which the material is delivered thereto. Fig. 2 is an elevation of the said interposed conveyer at the upper portion looking in a direction transverse to the view of Fig. 1. Fig. 3 is a top plan view of the parts shown in Fig. 1, and showing also a portion of the proofing conveyer. Figs. 4, 5 and 6, are detail views, respectively, of the three types of buckets composing the transferring conveyer. Figs. 7 and 8 are detail views, respectively, of the two types of bucket ends employed in the buckets shown in Figs. 4, 5 and 6.

As is well understood by those familiar with the art, it is customary for the dough coming from the dividing apparatus to be passed through a machine called the rounder-up which forms it into balls or loaves of uniform size, and from which it is conveyed as directly as possible to the proofing conveyer, which consists merely of a comparatively long conveyer chain provided with buckets or receptacles traveling slowly, usually in a serpentine path, in or through a room whose temperature and humidity are such as to encourage the proper action in the loaves of dough, resulting in the desired degree of lightness before they are put into an oven for baking. It is found, however, that when the balls of dough are passed directly or almost directly from the rounder-up into the buckets of the proofing conveyer they are of such consistency as to be liable to stick to the buckets of the conveyer, after having rested therein for ten minutes or some such time which constitutes the period of proofing; frequently, therefore, the contents of the buckets cannot be removed by merely inverting them and considerable time as well as a considerable amount of dough is thus lost or wasted. To avoid this difficulty the present invention provides an intermediate conveyer positioned between the rounder-up and the proofing conveyer proper, so designed that from one-half to three-quarters of a minute is consumed in the travel of a given bucket from the rounder-up to the point of discharge into the buckets of the proofing conveyer, and the time thus consumed is sufficient to effect the formation of a slight skin upon the loaves of dough which prevents them from adhering to the buckets of the proofing conveyer when transferred thereto, while the interval consumed in the intermediate conveyer is not long enough to permit the dough to become stuck to the buckets of this conveyer in the manner above mentioned with respect to the proofing conveyer in which the dough remains for a much longer period of time.

Referring to Fig. 1 of the drawings, the rounder-up machine is indicated at, A, and is shown provided with a discharge chute, A¹, from which the balls of dough are delivered to a transferring drum, B, whose construction and operation are more particularly described in my Patent No. 1,038,784, dated September 17, 1912. The transferring drum, B, discharges the loaves or balls of dough on to a short incline, B¹, from which they slide or roll by gravity into one of the buckets, C, of the intermediate or transferring conveyer. The direction of travel of these buckets when loaded is upward to the point at which the conveyer chains, C¹, pass around guide pulleys, C², and are thus deflected into a horizontal direction, and while traveling in this horizontal portion of their path the buckets, C, are dumped, discharging the dough into the buckets, D, of the proofing conveyer whose position with respect to the path of the buckets, C, is more clearly indicated in Fig. 2. Here it will be seen that while the buckets, C, are traveling horizontally the buckets, D, are traveling vertically in a path laterally adjacent to that of the buckets, C. This requires the presence of guide inclines or chutes, E, which deflect the balls or loaves of dough as they fall from the buckets, C, when the latter are dumped, and discharge them into a bucket of the proofing conveyer. To avoid excessive length in the proofing conveyer its buckets are made long enough to hold several balls of dough,—as illustrated, they are designed for three loaves each so that if each of the buckets, C, carries a single loaf a single bucket, D, may be filled by simultaneously discharging the contents of three of the buckets, C, into it. Fig. 1 shows three buckets, $C^x$, $C^y$, $C^z$, in discharging position, and illustrates three guide chutes, E, arranged to deliver the dough into the proper bucket, D, of the proofing conveyer. The simultaneous dumping of the three buckets, $C^x$, $C^y$, $C^z$, is accomplished as follows:—The fixed frame work, F, is provided with three stops, $G^x$, $G^y$, $G^z$, separated in the direction of travel of the conveyer by distances equal to those between successive buckets and positioned two at one side of the path of travel, and one at the other side, as indicated in Fig. 3. The buckets of the transferring conveyer are all pivotally hung from the conveyer chains, $C^1$, $C^1$, and are arranged in groups of three, the group, $C^x$, $C^y$, $C^z$, being typical. The bucket, $C^x$, is formed with plain ends; the bucket, $C^y$, has a lug or projection at one end adjacent to one of the chains, $C^1$, while the bucket, $C^z$, is provided with a similar lug at the opposite end, that is, adjacent to the other of the chains, $C^1$. The stops or trips $G^y$ and $G^z$, are of proper length to encounter, respectively, the projecting lugs of the buckets, $C^y$ and $C^z$, but do not extend far enough to engage the plain ends of the bucket, $C^x$, which will, therefore, pass both of these stops without being dumped by encounter therewith. Similarly the plain end of the bucket, $C^y$, will pass the stop, $C^z$, without effect. But, the trip, $G^x$, is enough longer than the stop, $G^y$, to encounter the plain end of the bucket, $C^x$, causing it to be inverted in its travel and thus to discharge its contents. Simultaneously the lugs or projections of the buckets, $C^y$ and $C^z$, will encounter, respectively, the trips, $G^y$ and $G^z$, and these buckets will be similarly inverted, as indicated in Fig. 1. Obviously, the long trip, $G^x$, will effect the inversion of both buckets, $C^y$ and $C^z$, as they pass it, but since at that time they will already have been emptied this feature is not objectionable. As above intimated, it is found that this intermediate handling of the loaves of dough between the delivery from the rounder-up and discharge into the proofing conveyer permits them to acquire enough of a "skin" to prevent them from sticking to the buckets of the proofing conveyer during the longer period of treatment in said buckets.

The drawings show a construction which results in a duplication of the transferring process as above described, in that the buckets, C, are made long enough to accommodate two loaves, each of which is delivered simultaneously from a rounder-up of double capacity. This necessitates the provision of an extra set of discharge chutes, $E^1$, whose upper ends register substantially with the middle of the buckets, C, as they pass over the chutes, and whose lower ends are positioned to discharge into a second bucket, $D^1$, of the proofing conveyer, thus the capacity of the plant is just doubled since two buckets of the proofing conveyer are filled simultaneously each with three loaves which are discharged from three buckets of the transferring conveyer, two loaves from each bucket.

I claim:—

1. In a conveyer comprising a series of pivotally suspended buckets, means for automatically dumping a plurality of said buckets simultaneously, comprising a plurality of fixed trips extending into different planes of the path of travel of said buckets and spaced apart along said path by intervals equal to those between successive buckets, the buckets being arranged in groups, and consecutive buckets of each group being respectively adapted for encounter with the different trips.

2. In a conveyer comprising a series of pivotally suspended buckets, means for automatically dumping a plurality of said buckets simultaneously, comprising a plurality of fixed trips of different lateral extent into the path of travel of the buckets and spaced apart along said path by intervals equal to those between successive buckets, said buckets being arranged in groups each of a number equal to the number of trips, and the buckets of each group having laterally extending portions respectively adapted for encounter with the different trips.

3. In a conveyer comprising a series of pivotally suspended buckets, means for automatically dumping a plurality of said buckets simultaneously, comprising a plurality of fixed studs of different lengths extending laterally into the path of travel of the buckets and spaced apart along said path by intervals equal to those between successive buckets, the ends of consecutive buckets being laterally extended by different amounts respectively for encounter with the respective studs, said studs being arranged in the order of their lengths, diminishing rearwardly with respect to the direction of travel.

4. In combination with a proofing conveyer of the bucket type, a transferring conveyer comprising a series of trough-shaped buckets each dimensioned to receive a plurality of balls of dough arranged in a single row transversely of the direction of travel of the bucket, means guiding said transferring buckets adjacent to the path of travel of the proofing conveyer buckets in a direction transverse thereto, means for automatically dumping the buckets of the transferring conveyer in such portion of their travel, and gearing operatively connecting the two conveyers for so relating their speeds that at the instant of dumping of a transferring bucket a plurality of buckets of the proofing conveyer are presented in position each to receive one of the balls of dough from said transferring bucket.

5. In combination with a proofing conveyer of the bucket type, a transferring conveyer comprising a series of trough-shaped buckets each adapted to receive a plurality of balls of dough arranged in a single row transverse to the direction of travel of the bucket, means guiding said transferring buckets in a horizontal direction, means adapted for automatically dumping each of said transferring buckets in the horizontal portion of its path, means guiding the buckets of the proofing conveyer in a vertical direction laterally adjacent to the horizontal portion of the transferring conveyer, and a plurality of inclined chutes having their upper ends positioned each to receive one of the balls of dough from the transferring buckets at the instant of dumping, and having their lower ends directed for discharging said balls of dough, respectively, into separate buckets of the proofing conveyer.

6. The combination of two bucket conveyers guided for travel proximate to each other in transverse directions, and means for discharging material from a plurality of buckets of one conveyer into a single bucket of the other conveyer by simultaneously dumping said plurality of buckets, said means comprising a plurality of trips extending into different planes of the path of travel of the buckets and spaced apart along said path by intervals equal to those between successive buckets, and a plurality of consecutive buckets being adapted for encounter with the several trips, respectively.

7. The combination of two bucket conveyers guided for travel proximate to each other in transverse directions, and means for discharging material from a plurality of buckets of one conveyer into a single bucket of the other conveyer by simultaneously dumping said plurality of buckets, said means comprising a plurality of trips of different lateral extent toward the path of travel of the buckets, and spaced apart along said path by intervals equal to those between successive buckets, and a plurality of consecutive buckets having laterally extending portions adapted for encounter with the several trips, respectively.

8. The combination of two bucket conveyers guided for travel proximate to each other in transverse directions, and means for discharging material from a plurality of buckets of one conveyer into a single bucket of the other conveyer by simultaneously dumping said plurality of buckets, said means comprising a plurality of fixed studs of different lengths extending laterally toward the path of travel of the buckets, and spaced apart along said path by intervals equal to those between successive buckets, the ends of consecutive buckets being laterally extended by different amounts, respectively, for encounter with the respective studs, said studs being arranged in the order of their lengths diminishing rearwardly with respect to the direction of travel.

In testimony whereof I have hereunto set my hand at Chicago, Illinois, this 23d day of December, 1912.

SAMUEL OLSON.

Witnesses:
ROBT. N. BURTON,
EDNA M. MACINTOSH.